United States Patent [19]

Faisandier

[11] 3,822,634
[45] July 9, 1974

[54] HYDRAULIC SERVO MECHANISM
[76] Inventor: Jacques Faisandier, 32, Bd. Felix Faure 92 Chatillon-sous-Bagneux, Chatillon-sous-Bagneux, France
[22] Filed: Feb. 11, 1972
[21] Appl. No.: 225,687

Related U.S. Application Data
[63] Continuation of Ser. No. 18,732, March 11, 1970, abandoned.

[30] Foreign Application Priority Data
Apr. 1, 1969   France .............................. 69.09971

[52] U.S. Cl...................... 91/384, 91/467, 137/596, 137/601
[51] Int. Cl............................................. F15b 9/10
[58] Field of Search ...... 137/601, 596; 91/467, 457, 91/384

[56] References Cited
UNITED STATES PATENTS

| | | | |
|---|---|---|---|
| 444,066 | 1/1891 | Grant, Jr................................ | 91/467 |
| 2,351,317 | 6/1944 | Camerota ............................. | 91/457 |
| 2,515,475 | 7/1950 | Shoemaker........................... | 91/384 |
| 3,272,062 | 9/1969 | Flippo et al........................... | 91/384 |

Primary Examiner—Paul E. Maslousky

[57] ABSTRACT

A hydraulic servo mechanism with two servo valves that normally operate in parallel. When one of the valves becomes seized a differential mechanism causes the valve to effectively operate differentially. In result, the gain of the mechanism is increased so that the operative valve produces a mechanism output substantially equivalent to the output when both valves are operating.

6 Claims, 2 Drawing Figures

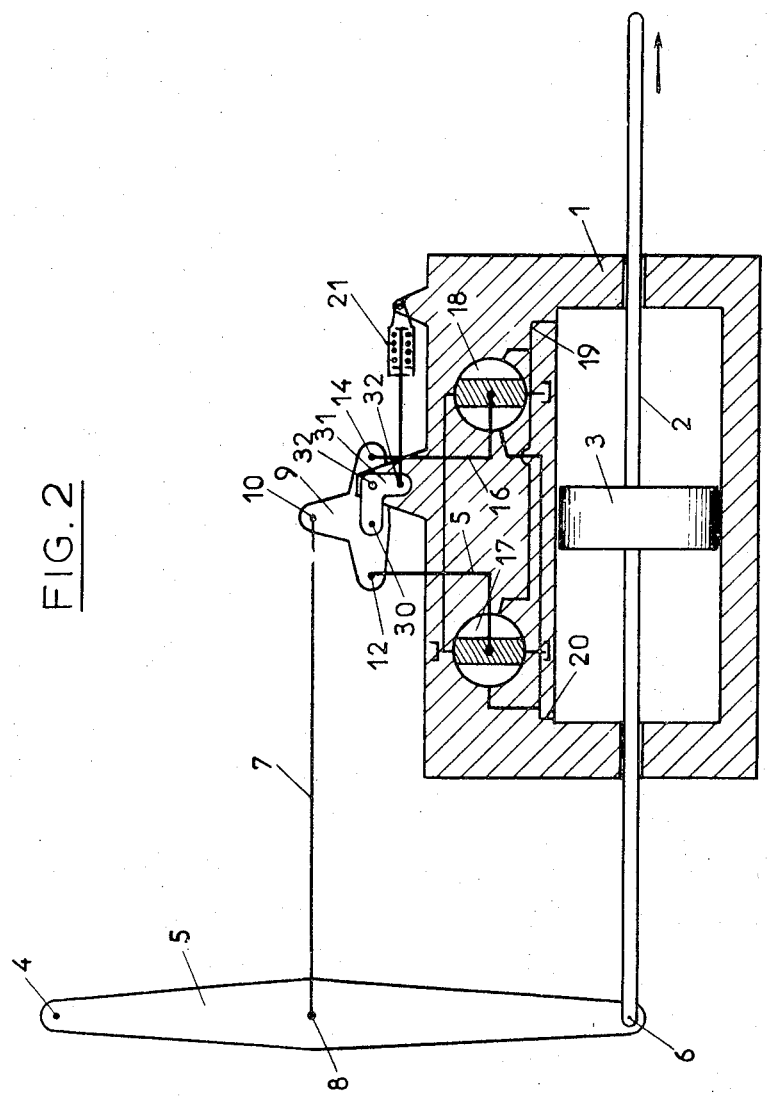

HYDRAULIC SERVO MECHANISM

This is a continuation of application Ser. No. 18,732, filed Mar. 11, 1970.

BACKGROUND OF THE INVENTION:

1. Field of the Invention

This invention relates to the field of hydraulic servo mechanisms and more particularly to servo mechanisms controllable hydraulic fluid distributors connected with a common hydraulic actuator so that a failure of one component does not render the mechanism inoperative.

2. Description of the Prior Art

Redundant servo mechanisms have, in recent years, received increased interest particularly in the field of aviation where hydraulic controls are so frequently employed. Redundancy is more commonly found in components which are critical to the operation of a system. In some cases, complete systems themselves may be duplicated or triplicated to provide the desired degree of confidence.

Redundant systems of the prior art take various forms. In some arrangements, such as employed in aircraft, the pilot is integrated in the system to provide overall command in the event of a failure. In such devices a hydraulic distributor may be driven by a pilot-operated rod which includes a pre-loaded spring box. Normally the spring box causes the pilot commands to be transmitted to one or more servo valves which in turn control a hydraulic power piston and an airfoil. In the event of a seizure of the hydraulic valve, the pre-loaded spring box is compressed and an electrical switch connected to the box detects the compression and signals the pilot by means of a visual or audio warning device. The pilot at this point then has the option of shutting off the malfunctioning servo or continuing to operate the valve if the malfunction does not totally interfere with his commands. If the pilot elects to disable the hydraulic servo mechanism, the failed mechanism is generally placed in bypass in conjunction with the de-energizing of the hydraulic power source to prevent hydraulic lock from interfering with airfoil movement.

In other redundant mechanisms, a failed hydraulic servo may automatically be removed from its operative relationship with the system without the intervention of a human operator such as the pilot. For example, the failure detection signal produced by the spring box in the system referenced above may not only warn the pilot but also may actuate an automatic shut-off of the hydraulic servo mechanism in the failed channel. The automatic system may be entirely mechanical or hydromechanical. The automatic systems are generally sophisticated and may be difficult to test. In addition, an inadvertent operation of the automatic shutdown system may be ill-timed and could create a dangerous situation.

It is accordingly an object of the present invention to provide a servo control mechanism which eliminates the intervention of the human operator in all but exceptional cases.

It is a further object of the present invention to provide a servo mechanism with automatic failure detection features that is reliable in operation.

It is a principal object of the present invention to provide a several mechanisms including two valve distributors which continue to operate after a failure and to secure full operation. The object is obtained by operating the hydraulic distributors in parallel before a failure and differentially after the failure.

SUMMARY OF THE INVENTION

The hydraulic servo mechanism of the present invention comprises two hydraulic servo distributors, either redundant or non-redundant, which normally operate in parallel to supply a power actuator with hydraulic fluid. In the event of a seizure of one of the hydraulic distributors, a failure mechanism effectively causes the distributors to operate differentially, that is, the signal supplied to the failed distributor is effectively added to the signal supplied to the operative distributor.

The input commands are introduced to a floating lever which transmits the signal simultaneously to two operating linkages connected respectively to the two hydraulic distributors. These two control linkages in normal operation move symmetrically. Upon a seizure which locks one of the control linkages, the other control linkage is displaced by twice the amount that occurs in normal operation. The increased displacement provides increased gain to one of the hydraulic distributors and consequently the output of the operative distributor is substantially twice its normal output for the same input command. The resulting output of the power actuator, which is normally controlled by both distributors together, remains essentially the same.

The input linkage transmits the input commands to both of the symmetrically located control linkages in normal operation with the aid of a floating lever. Upon the seizure of one of the hydraulic distributors, the compliance of the floating lever permits the input linkage to continue operating and places the two distributors in differential operation.

BRIEF DESCRIPTION OF THE DRAWINGS

The invention may be better understood by reference to the accompanying drawings wherein like parts are given like reference numerals throughout the several figures.

FIG. 2 is a cross-sectional view of an alternate embodiment of the servo mechanism showing the two hydraulic valves operated by a floating link stabilized on the housing of the servo mechanism.

Figure 1:
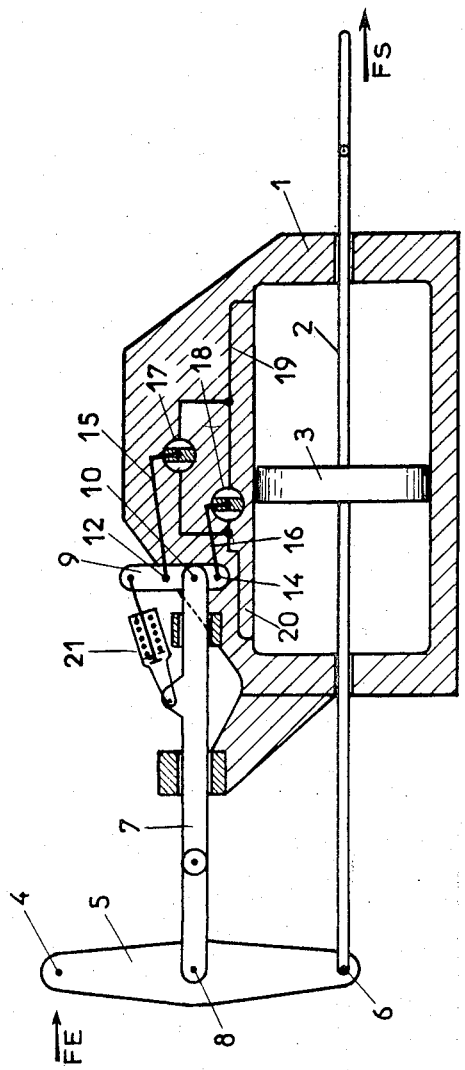
FIG. 1 is a cross-sectional view of the servo mechanism showing two hydraulic valves operated by a floating link which is stabilized on an input command linkage.

DESCRIPTION OF THE PREFERRED EMBODIMENTS:

The servo mechanism shown in FIG. 1 has a body 1 which would be fixed, for example, in the fuselage of an aircraft and an output rod 2 operated by a power piston 3 within a cylinder integrally formed in the body 1. The input command designated by the arrow labeled FE acts at a point 4 on the floating lever 5 to produce an output FS on rod 2. The lever 5 is pivotally mounted to the feedback portion of rod 2 at pivot point 6 and is additionally connected to control linkage 7 at pivot point 8.

The linkage 7 is in turn connected to a second floating lever 9 at pivot point 10. The floating lever 9 additionally has pivot points 12 and 14 which are connected respectively to connecting rods 15 and 16. The connecting rods 15 and 16 in turn operate cranks on two rotary valves 17 and 18 respectively. The valves are connected in parallel with ducts 19 and 20 which lead to opposite sides of the cylinder containing the power piston 3. While the particular valves shown are rotary valves, it is contemplated within the scope of the present invention that other types of valves such as slide valves may be incorporated without destroying the essential purpose of the novel servo mechanism.

For the sake of clarity, the hydraulic supply pressure and return lines and their connections to the rotary valves are not shown in this figure. It will be understood that the valves 17 and 18 are shown schematically and are intended to control the flow of hydraulic fluid through the ducts 19 and 20 in accordance with the rotation of the valves by the rods 15 and 16. The connections to the valves are selected so that parallel rotations of the valves 17 and 18 produce substantially the same flow from the valves. Fluid moving through ducts 19 and 20 will therefore represent approximately twice the flow from either valve in normal operation of the servo mechanism.

It will be understood that the valves are actuated by the displacement of linkage 7, floating lever 9 and the two connecting rods 15 and 16. The pivot points 12 and 14 on the floating lever are situated equidistant from the pivot point 10 on opposite sides of the linkage 7. The lever 9 is stabilized in normal operation on the linkage 7 by means of a spring box 21 which holds the lever 9 in a position generally perpendicular to linkage 7.

In normal operation valves 17 and 18 are acted upon simultaneously by the connecting rods 15 and 16 displaced symmetrically by the linkage 7. The symmetric displacement of the rods 15 and 16 produces equal rotations of the valves in the same direction and correspondingly produces substantially equal hydraulic flows to actuate the power piston 3.

In the event of a seizure of valve 18, for example, pivot point 14 becomes a fixed point and the input linkage 7 causes lever 9 to pivot clockwise or counterclockwise about pivot 14 thereby causing point 12 to displace exactly twice the distance it would otherwise displace if the valve 18 had not seized and pivot point 14 were not fixed. The rotation of valve 17 will be twice as large as that expected when valve 18 is operative and it can be expected that the flow rate from valve 17 will also be substantially twice as large. In effect, the lost flow rate of valve 18 has been added differentially to the flow rate of valve 17, and the net flow rate through ducts 19 and 20 remains the same. As a consequence, the output FS of power piston 3 and rod 2 will be substantially the same as that expected during normal operating conditions when both valves 17 and 18 operate in parallel. The mechanism as a whole operates as if the valve 18 had not failed. A spring box, shown schematically at 21, is provided for damping vibrations of lever 9 regardless of the direction of rotation of this lever. The damping means acts directly on lever 9 as shown and will suppress vibrations regardless of the direction of movement of lever 7; i.e., the damping action of the spring in spring box 21 is the same when lever 9 rotates clockwise or counterclockwise.

The differential operation of the two valves 17 and 18 is essentially the same regardless of which valve seizes and regardless of what position the valve is in when the seizure occurs.

In the event that the seizure occurs near the end of the rotation of the valve, equal and opposite flows between the two valves will occur at the steady state position of the output rod 2. Consequences of the equal and opposite flows between the valves may be a lowering of the hydraulic pressure in the system and the generation of heat due to the energy loss through the valves. While this condition may be extremely rare, it is important in a case of this kind that the pilot be warned of the condition. Accordingly, it is possible to provide electrical contacts on the spring box 21 which indicate that the floating lever 9 is not in its normally perpendicular position with respect to the linkage 7. The electrical contacts on the spring box may signal a warning to the pilot that the hydraulic supply to the failed valve should be shut off. The warning may be given equally as well by the temperature of the hydraulic fluid since the generation of heat from the equal and opposite flows raises the temperature of the fluid.

A second embodiment of the novel servo mechanism is disclosed in FIG. 2. The operation of the alternate embodiment is essentially the same as that disclosed in the embodiment of FIG. 1. In normal operation valves 17 and 18 are rotated by equal amounts to contribute substantially equally to the actuation of piston 3 and rod 2. The hydraulic pressure source and return reservoirs are also indicated schematically by brackets located near the lands of the valve rotors.

The principal distinctions of the alternate embodiment in FIG. 2 relate to the kinematics of the floating lever 9. Instead of being stabilized on linkage 7, lever 9 is pivotally rotated at point 30 on the end of bell crank 31. Bell crank 31 is in turn pivotally rotated to the body 1 at a central pivot point 32 and is stabilized with respect to the body 1 by means of the spring box 21 connected to the crank 31 at pivot point 34. The lever 9, therefore, rotates about a resiliently stabilized pivot point 30.

In operation, the floating lever 9 in the alternate embodiment rotates in response to the linkage 7 and rotates the valves 17 and 18 in the same direction. If either of the valves seizes, one of the pivot points, 12 or 14, becomes a fixed point and the other pivot point displaces twice the amount expected in normal operation. The compliance of spring box 21 permits the bell crank 31 and pivot point 30 to displace by an amount necessary to accommodate the movement of one pivot point, 12 or 14, about the other. In the FIG. 2 embodiment the damping means 21 acts indirectly on lever 9 through the intermediary of the pivoting lever 31. Thus, if valve 18 seizes, point 14 becomes fixed and the floating lever 9 becomes a pivoting lever about the point 14. Should lever 9 vibrate for any reason, articulation point 30 will vibrate therewith and thus lever 31 will vibrate about point 32. Any vibrations of lever 31 are damped by the spring forces in damping means 21 and thus vibrations of lever 9 are damped as a consequence of the damping of the vibrations of point 30.

While the novel servo mechanism has been disclosed in several embodiments, it will be understood that various modifications and substitutions can be made without departing from the spirit or purpose of the present invention. As mentioned above, slide valves can be readily substituted for the rotary valves shown in the several embodiments. In addition, various substitutions for the mechanical linkages can be made without destroying the parallel operation of the valves 17 and 18.

For example, instead of using linkages to operate cranks on the valve rotors, it may be desirable in certain instances to drive the rotors by means of a differential gearing such as the type used in the drive axle of an automobile. Basically a differential is simply a summing device in which the sum of the rotations of two shafts is proportional to the rotation of the third shaft. In the application of the differential gearing to the present invention, the third shaft would be rotated by an amount corresponding to the input command and the other two shafts would be connected respectively to the two rotary valves. When one of the valves became jammed, the differential gearing would automatically double the rotation of the other shaft connected to the operational valve. It will therefore be understood that the present invention has been described by way of illustration rather than limitation.

What is claimed is:

1. In a hydraulic control mechanism having a displaceable member and two controllable hydraulic fluid distributors connectable to a common hydraulic control pressure source for the displaceable member, each of said distributors including a movable valve member, improved apparatus for controlling the valve members comprising means including a first floating lever for controlling the valve members in parallel, said first floating lever having a displaceable input connection to an input linkage and a pair of first displaceable output connections and a second displaceable output connection, said pair of output connections being connected to respective of said valve members, said displaceable input connection being symmetrically disposed with relation to said output connections of said first pair and being spaced from said second output connection, and stabilizing means for said first floating lever, said stabilizing means being connected to said second output connection.

2. The apparatus of claim 1 further comprising means connecting said stabilizing means to the input linkage.

3. The apparatus of claim 1 wherein the hydraulic fluid distributors have a common housing and wherein said lever including means further comprises:
a pivotal lever mounted to the housing of the distributors, said first floating lever being supported by the pivotal lever at a point equally distant from the output connections of said first pair; and wherein said stabilizing means comprises:
damping means connected between said pivotal lever and the housing for resiliently stabilizing the pivotal lever on the housing.

4. The apparatus of claim 1 wherein said controlling apparatus further comprises:
a second floating lever, said second floating lever having a displaceable input connection and a pair of output connections;
means including said input linkage for connecting a first output connection of said second floating lever to said first floating lever displaceable input connection; and
means connecting the second output connection of said second floating lever to the control mechanism displaceable member.

5. The apparatus of claim 4 wherein the hydraulic fluid distributors have a common housing and wherein said first floating lever including means further comprises:
a pivotal lever mounted to the housing of the distributors, said first floating lever being supported by the pivotal lever at a point equally distant from the output connections of said first pair; and wherein said stabilizing means comprises:
damping means connected between said pivotal lever and the housing for resiliently stabilizing the pivotal lever on the housing.

6. In a hydraulic servo mechanism having two controllable hydraulic fluid distributors operatively connected to a common hydraulic actuator, and apparatus for controlling the distributors comprising means including a floating lever for controlling the distributors in parallel, said lever having a displaceable input connection supported on an input linkage and two symmetrically displaceable output connections connected respectively to the two distributors, said apparatus further comprising means connected between the floating lever and the input linkage for resiliently stabilizing the lever on the linkage.

* * * * *